Nov. 18, 1947.  J. A. BARGER  2,430,853
ANIMAL TAGGING DEVICE
Filed June 5, 1946   3 Sheets-Sheet 1

INVENTOR
J. A. BARGER
BY Rudolph L. Howell
ATT'Y

Nov. 18, 1947.     J. A. BARGER     2,430,853
ANIMAL TAGGING DEVICE
Filed June 5, 1946     3 Sheets-Sheet 2
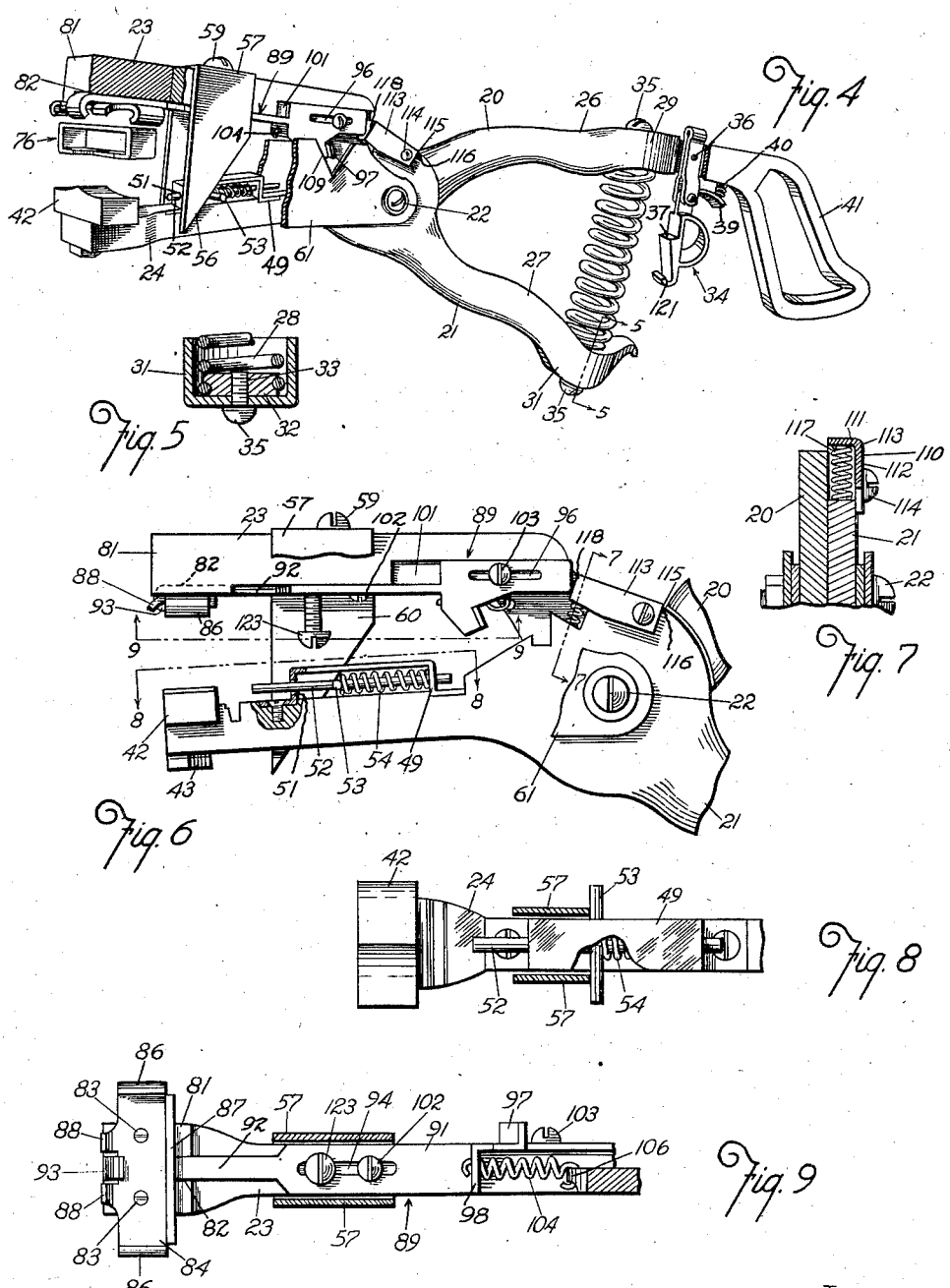
INVENTOR
J. A. BARGER
BY Rudolph L. Lowell
ATT'Y

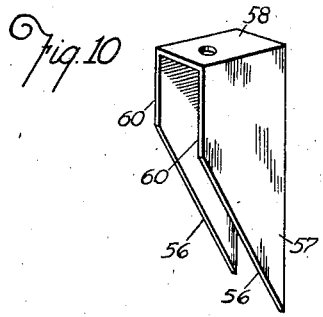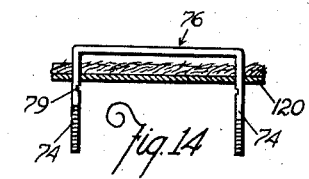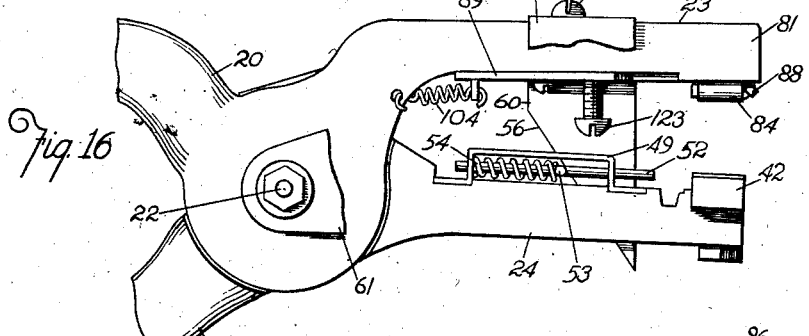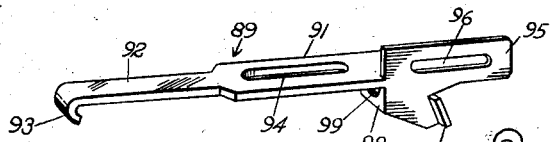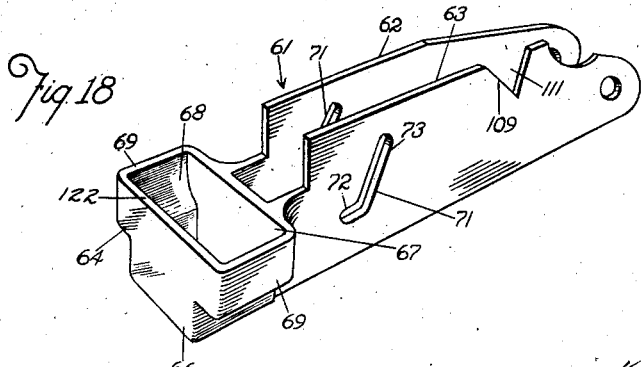

Patented Nov. 18, 1947

2,430,853

UNITED STATES PATENT OFFICE 2,430,853

ANIMAL TAGGING DEVICE

John A. Barger, Des Moines, Iowa

Application June 5, 1946, Serial No. 674,565

17 Claims. (Cl. 128—329)

This invention relates generally to devices for marking livestock and in particular to a device for attaching tags to the ears of livestock.

The tagging of ears of livestock for identifying registered stock, and for marking stock given preventive treatment or tests against certain diseases prescribed by State health officials, is a common practice. However, the tagging procedures now in general use are not entirely satisfactory, because of the time involved in completing a tagging operation and the resultant increased pain to which the tagged animal is subjected. Further because of the varying temperament of animals it is desirable that the tagging be accomplished quickly and that the tagging device be free of the animal before the animal is completely aware of what is taking place, so as to avoid possible injury to the tagging device operator by a frightened animal.

Another objection to many of the tagging devices now in use is the fact that they do not cleanly pierce the ear of the animal, or uniformly bend the tags on the ears. When the cut in the ear is ragged, or the free ends of the tag prongs are pressed into the ear, serious infections oftentimes occur. Further tagging devices now generally used do not positively secure a tag on an animal's ear so that the tag, in the normal habits of the animal, becomes loosened or unclinched and falls from the ear.

It is an object of this invention, therefore, to provide an improved animal tagging device.

A further object of this invention is to provide a tagging device in which the tag is automatically released from the device on completion of the tag bending operation.

Yet another object of this invention is to provide an ear tagging device in which the ear is pierced by the tag, and the tag completely extended through the ear, prior to bending or securing the tag on the ear.

Another object of this invention is to provide an ear tagging device which, after the device is loaded and placed in position relative to an animal's ear, is completely operable on actuation of a finger operated trigger, to secure the tag on the ear and then free the tagged ear from the device.

A still further object of this invention is to provide an ear tagging device which is adapted to limit the bending of the tag on the ear so as to prevent the free ends of the tag prongs being pressed into the animal's ear.

Yet another object of this invention is to provide a tagging device which is light in weight so as to be easily carried in one hand, and completely operable by such one hand to eliminate any need of the operator being in close proximity to the animal being tagged.

A further object of this invention is to provide a tagging device which is of a simple and compact design, efficient in operation to uniformly and quickly tag animals' ears, adapted to withstand hard use and handling over a prolonged service life with a minimum of attention, and capable of being economically manufactured.

A feature of this invention is found in the provision of an ear tagging device having means for releasably holding a tag, and cooperating means for bending and securing the tag on an animal's ear. Operable in a timed relation with the bending means is a member which strips the tag through the animal's ear, prior to the bending operation, with means being provided to release the tagged ear and move the stripping member away from the tagged ear, after the bending operation, so that the device is entirely free of the animal.

Another feature of this invention is found in the provision of a tagging device in which the tag has the free ends of its prong portions acted upon by a common bending member adapted to bend the prongs into a common plane spaced from the animal's ear so as to eliminate any pressing of the prongs into the animal's ear.

Further objects, features and advantages of this invention will become apparent from the following description when taken in connection with the accompanying drawings in which:

Fig. 4 is a perspective view of the tagging device, on completion of a tagging operation, with certain parts being broken away to more clearly show its construction;

Fig. 5 is a fragmentary sectional view as seen along the line 5—5 in Fig. 4;

Fig. 6 is a fragmentary side elevational view with the stripper member broken away;

Fig. 7 is an enlarged sectional detail view taken along the line 7—7 in Fig. 6;

Figure 3:
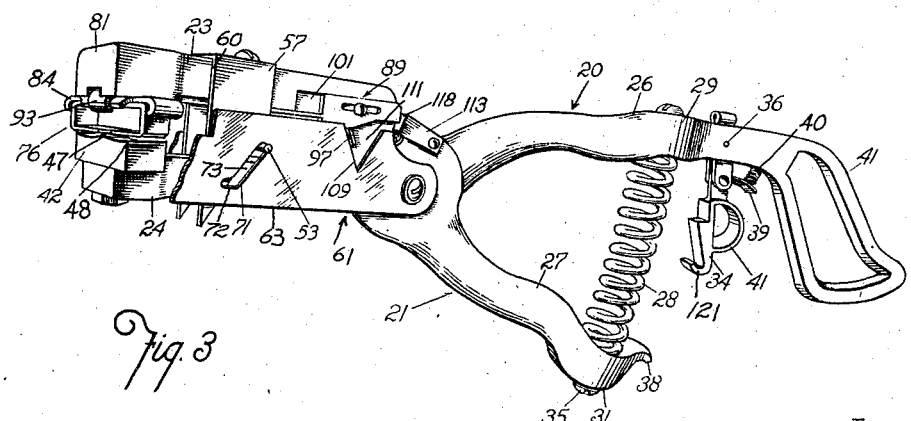
Fig. 3 is a perspective view of the tagging device in a fully released position and showing certain parts broken away.

Figs. 8 and 9 are sectional detail views as seen along the lines 8—8 and 9—9, respectively, in Fig. 6;

Fig. 10 is a perspective detail view of a cam member forming part of the means for controlling the movement of the stripper member;

Fig. 11 is a perspective detail view of a tag for the tagging device of this invention;

Fig. 12 is an end elevational view of the tagging device looking toward the right in Fig. 3 and with the stripper member removed;

Fig. 13 is a sectional view taken on the line 13—13 in Fig. 12;

Fig. 14 is a detail sectional view showing an initial piercing of an animal's ear by the tag as accomplished by the stripper member;

Fig. 15 is illustrated similar to Fig. 14 and shows the tag in a finally secured position in an animal's ear;

Fig. 16 is a fragmentary side elevational view of the tagging device with the stripper member and cam means therefor broken away;

Fig. 17 is a detail perspective view of a slide member forming part of the tag release mechanism; and Fig. 18 is a detail perspective view of the stripper member.

Figure 1:
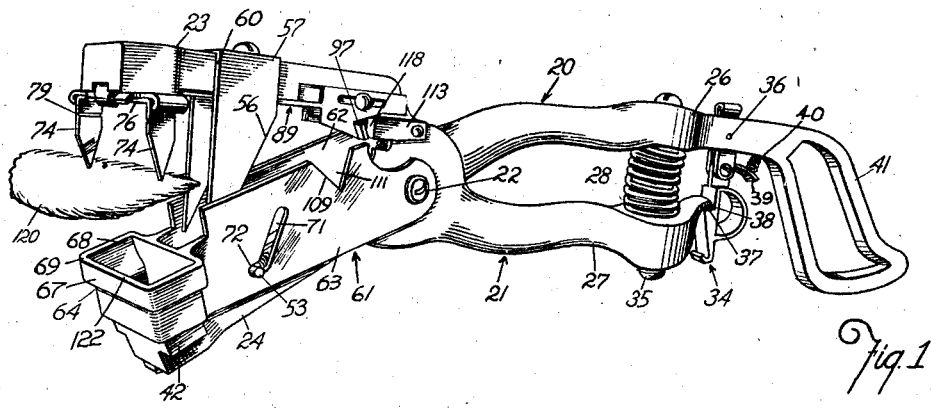
Fig. 1 is a perspective view of the tagging device of this invention shown in a set position.
Figure 2:
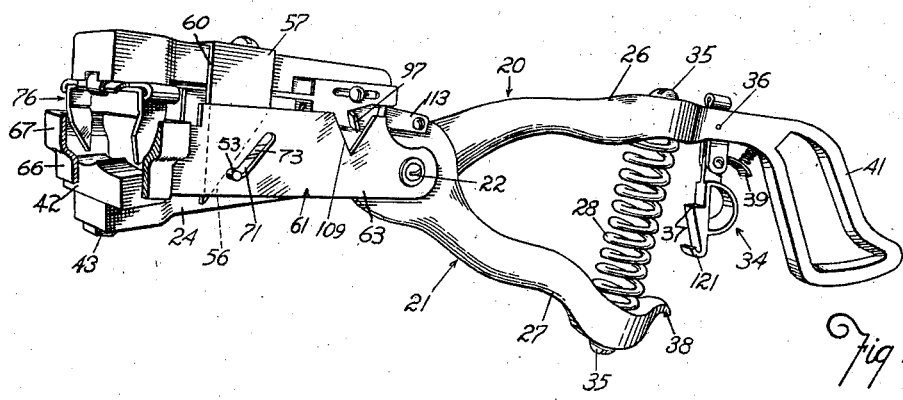
Fig. 2 is a perspective view of the tagging device in a partially released position and with certain parts broken away.

With reference to the drawings the ear tagging device of this invention is illustrated in Figs. 1, 2 and 3 as including a pair of pivoted operating levers 20 and 21, pivotally connected intermediate their ends at 22 and having cooperating closing members or jaws 23 and 24, respectively, at one of their ends. The jaws 23 and 24 are movable to a closed position on movement of their corresponding lever ends 26 and 27, respectively, away from each other.

Movement of the jaws 23 and 24 to their closed positions is accomplished by means including a coil spring 28 which is arranged between the lever ends 26 and 27 with its opposite ends received in pockets 29 and 31, integrally formed in the lever ends 26 and 27, respectively. Each end of the spring 28 (Fig. 5) is in threaded engagement with a plug member 32 having a threaded opening 33 for receiving a bolt 35 extended through the bottom end of a pocket 29 and 31. The spring 28 is thus rigidly secured at its opposite ends with the operating lever ends 26 and 27.

On manual movement of the lever ends 26 and 27 toward each other, the spring 28 is compressed to set the tagging device for operation as will appear later on. The device is releasably held in a set position, illustrated in Fig. 1, by a trigger member 34 pivoted at 36 on the lever 20 and formed with a shoulder or latch 37 adapted for releasable engagement with a hook or catch 38 at the free end of the lever end 27. The trigger 34 is biased toward an engaging position with the catch 38 by a coil spring 40 arranged in compression between the lever end 26 and a projection 39 extended rearwardly from the trigger member 34.

Integrally formed with the lever 20, at its end 26, is a handle 41, by which the device is held in the manner of a revolver, with one finger receivable in a loop 41 provided on the trigger member 34. On actuation of the trigger the spring 28 is released whereby the jaws 23 and 24 are moved toward each other to a closed position.

The jaw 24, adjacent its free end, carries an anvil or hammer 42 of a substantially rectangular shape, which is secured to the jaw by a bolt 43 (Figs. 2 and 12). The anvil 42 has a tag engaging surface formed with a pair of adjacent concavely curved portions 44 having their inner adjacent ends terminating in a common rib 47 which is projected above the outer edges 48, of the concavely curved surface portions 44 for a purpose which will appear later.

Carried on the jaw 24, rearwardly of the anvil 42, is a longitudinally extended bracket 49 of a substantially inverted U-shape (Figs. 4, 6 and 8). The legs of the U-bracket 49 are formed with oppositely arranged openings 51 for loosely receiving a spring pressed member 52 integrally formed with a transversely extended pin member 53 which is movable between the legs of the U-bracket 49. A coil spring 54, mounted about the member 52, is arranged in compression between the pin member 53 and the rear leg of the bracket member 49 whereby to continuously urge the member 52 in a forward direction, and the pin member 53 into an engaging position with tapered rear edges 56 formed on a cam member 57.

The cam member 57 (Figs. 4, 10 and 16) is of an inverted U-shape and has its base 58 secured by a bolt 59 to the top side of the jaw 23. The legs 60 of the cam member 57 are extended toward the jaw member 24 and are of a length such as to straddle both of the jaw members 23 and 24. The tapered or cam edges 56 are inclined upwardly and rearwardly from the front edges of the leg members 60. The transverse pin 53, on the spring pressed member 52, is slidable on the cam edges 56 to control the movement of a pivoted stripper member 61 relative to the movement of the jaw member 24.

As illustrated in Figs. 2 and 18 the stripper member 61 is of a generally U-shape and has legs 62 and 63 connected together by a base member 64 of a substantially box shape having a reduced lower section 66 of a size adapted to receive the anvil 42 therein. The larger section 67 of the base member 64 has the inner surfaces 68 of its endwalls 69 sloped downwardly and inwardly to join the endwalls of the reduced section 66 for a purpose to be later explained.

The stripper member 61 is of a length substantially equal to the length of the jaw 24 and has its legs 62 and 63 arranged at opposite sides of the jaw member 24 and pivoted at their free ends on the pivot 22 for the operating levers 20 and 21. As clearly appears in Figs. 1, 2 and 3, the legs 62 and 63 of the stripper member are spaced away from the sides of the jaw member 24 a distance to provide for the reception of the legs 60 of the cam member 57 between the jaw member 24 and the legs of the stripper member.

Formed in the legs 62 and 63 of the stripper member is a pair of oppositely arranged slots 71 adapted to loosely receive the opposite ends of the transverse pin member 53. Each slot 71 is formed with a short longitudinal section 72 and an upwardly and rearwardly inclined section 73.

When the tagging device is in its set position shown in Fig. 1 the ends of the pin 53 are located in the short slot sections 72. On release of the coil spring 28 the stripper member 61 is moved with the jaw member 24 towards the jaw member 23, by virtue of the engagement of the pin 53 with the stripper member at the slot sections 72. This concurrent movement of the stripper member 61 and jaw member 24 is continued until the pin 53 engages the cam edges 56 of the cam member 57, at which time the stripper member is in engagement with the prongs 74 of a tag member 76 carried on the jaw 23, as will be described later. The stripper member is then held by the tag 76 against further pivotal movement with the jaw 24, and the jaw 24 continues its movement alone towards the jaw 23, by virtue of the sliding action of the pin 53 in the inclined slot portions 73.

The pin 53 and slots 71 thus constitute a lost motion connection between the stripper member 61 and the jaw 24 for a purpose which will later become apparent.

The tag 76 (Figs. 1 and 11) is of a generally U-shape and each of the prongs 74 is formed with a short tapered side 77 and a long tapered side 78. The prongs 74 are scored or grooved at 79 to define the point of their bending toward each other in a tagging operation.

In order to releasably hold the tag 76 in the tagging device, the jaw 23 is provided adjacent its free end with a head member 81 (Figs. 4, 6 and 9) formed with a forwardly and rearwardly extended groove 82 the bottom of which is flush or level with the bottom side of the jaw 23. Secured to the top of the head member 81, by screws 83, is a clip member 84 of an irregular shape and integrally formed with a body member of a generally rectangular shape positioned lengthwise across the groove 82 with its ends projected laterally from the head member 81. The ends of the body member are formed with upwardly extended lips 86, while the rear side of the body member is provided with an upwardly and inwardly projected lip 87. The end lips 86 and the rear lip 87 are relatively arranged so as to loosely receive the base of the tag 76 therebetween.

The front side of the clip body member is formed with a pair of longitudinally spaced guide members 88 which are arranged at opposite sides of the groove 82 and inclined upwardly and forwardly from the clip body member.

The tag 76 is releasably held in the clip member 84 by a slide member 89 (Figs. 4, 9 and 17). The slide member 89 is of an irregular shape and integrally formed with a body member 91 having a reduced forward extension 92 slidably movable within the groove 82 between the guide members 88 and below the clip member 84. The free end of the extension 92 is formed with a hook 93 for engaging the base of the tag 76. The body member 91 is formed with a centrally located longitudinally extended slot 94.

An upright rear extension 95 on the body member 91 is formed adjacent its upper edge with a longitudinally extended slot 96, and adjacent its lower edge with a lateral outwardly projected cam follower member 97. An inwardly extended lateral projection 98 at the front end of the rear extension 95 is formed with an opening 99.

When the slide member 89 is assembled on the jaw 23 with its front extension 92 within the groove 82 and the hook 93 extended downwardly for cooperative action with the lips 86 and 87 on the clip member 84, the body member 91 is slidably movable on the under side of the jaw member 23 and the upper portion of the rear extension 95 is slidably movable in a longitudinally extended groove 101 formed in one side of the jaw 23 adjacent to its rear end. The slide member 89 is retained in assembly position on the jaw member 23 by the provision of screws 102 and 103 (Figs. 6 and 9) loosely extended through the slots 94 and 96, respectively, and threadable in the jaw 23. The member 89 is biased in a rearward direction by a coil spring 104 having one end connected with the member 89 at the opening 99 and its opposite end connected at 106 with the jaw member 23. It is seen, therefore, that on forward movement of the slide member 89 against the action of the spring 104, the hook 93 is moved away from the clip 84 to provide for the reception of the tag 76 between the lip members 86 and 87. The tag is releasably held against movement out of the clip member 84 on release of the slide member 89 and its movement in a rearward direction by the spring 104.

The lateral projection 97 on the slide member 89 is engageable with one side 109 of a V-notch 111 formed in the top edge of the stripper member leg 63 at a position adjacent to the rear end of the stripper member. The tapered edge 109 constitutes a cam surface for the lateral projection 97.

Pivotally mounted on the operating lever 21 at a position above the pivot 22 for the levers 20 and 21, is an actuating member 113 (Figs. 4, 6 and 7) of a substantially L-shape in transverse cross section. The long leg 110 of the pivoted member 113 is positioned adjacent to the outer side of the lever 21 while its short leg 111 is of a length which is slightly less than the thickness of the lever 21 at the pivotal connection 22. As a result the member 113 is movable with the lever 21 relative to the lever 20. The member 113 is pivoted adjacent its rear end on a screw 114 which is extended through the long leg 110 and threadable in the lever 21. The rear edge 115 of the short leg or top side 111 of the pivoted member 113 is adapted for engagement with the lever 21 at the point 116 to limit its upward and rearward pivotal movement in response to the action of a coil spring 117 arranged in compression between the lever 21 and the top side 111.

The pivoted member 113 is of a length such that on movement of the jaw 24 to a closed position relative to the jaw 23, as illustrated in Fig. 3, its forward edge 118 is movable by the spring 117 into abutting engagement with the rear edge of the rearward extension 95 on the slide member 89.

In the operation of the tagging device of this invention the tag 76 is first insertable within the clip 84. To position the jaws 23 and 24 apart for this purpose the spring 28 is manually compressed until the catch 38 is engageable with a hook 121 formed at the free end of the trigger member 34. This engagement of the catch 38 with the hook 121 holds the jaws 23 and 24 spread apart a distance sufficient to readily provide for the insertion of the tag 76 within the clip 84, and positively locks the trigger member 34 with the catch 38 to eliminate any accidental springing of the tagging device. The engagement of the hooks 38 and 121 thus defines what may be termed a "loading" or "safety" position for the device.

With the tag 76 releasably locked in the clip 84 the spring 28 is further compressed, by manually pressing the lever ends 26 and 27 toward each other, until the catch or hook 38 is engageable with the shoulder 37, whereby the tagging device is set for operation.

In this set position of the tagging device the pin 53 is in the slot portions 72 and out of engagement with the cam edges 56, the lateral projection 97 on the slide member 89 is out of engagement with the cam edge 109 on the stripper member leg 63, and the pivoted member 113 has its forward edge 118 located rearwardly of and closely adjacent to the lateral projection 97 and forwardly of the rear edge of the slide member 89. The tagging device, in its set position, is then grasped in one hand at the handle 41 and manipulated to position an animal's ear, designated as 120 in Fig. 1, so that the top side of the ear is located adjacent to the tag prongs 74 and between the jaws 23 and 24.

As clearly appears in Fig. 1 the anvil 42 is within the reduced section 66 of the box member 64 on the stripper member 61 so that on release of the trigger 34 to spring the tagging device, the ear 120 is first engaged by the stripper member rather than by the anvil 42. Thus on closing of the jaws 23 and 24 the ear 120 is initially engaged by the top peripheral edge 122 of the enlarged box section 67, and pressed against the prongs 74, which pierce the ear and initially pass therethrough as illustrated in Fig. 14. With the prongs 74 extended through the ear 120 the movement of the stripper member 61 and the jaw 23 as a unit is continued, by virtue of the pin and slot connections 53—71, to provide for an initial bending of the prongs 74 inwardly toward each other by their engagement with the tapered inner walls 68 to a position, as illustrated in Fig. 2, at which their free ends are within the confines of the reduced box section 66. The prongs 74 are uniformly bent toward each other by virtue of their being weakened at the grooves 79.

When this initial bending of the prongs 74 takes place, the pin 53 engages the cam edges 56 whereby the pin is moved out of the slot portions 72, as shown in Fig. 2, and into the slot portions 73 as illustrated in Fig. 3. The prongs 74 then act as stop means to limit a further pivotal movement of the stripper member 61, and the jaw 24 moves within the stripper 61 against the action of the spring 54 acting on the pin 53. As a result the pin 53 is moved upwardly in the slot portions 73 on movement of the jaw 24 independently of the stripper member 61. Since the ends of the prongs 74 are initially bent by the stripper member 61 into the path of travel of the anvil 42, these ends are engaged by the anvil adjacent to the outer edges 48 of the curved surface portions 44.

As the anvil advances toward the jaw 23 the free ends of the prongs are moved toward the common rib 47 on the anvil and to positions adjacent to each other by virtue of the clearance provided by their long tapered sides 78 (Figs. 3, 12 and 13). In other words, the long sides 78 of the prongs 74, when the prongs are finally bent, are located in a substantially common plane to prevent the prongs being caught on an object by the animal, or the sticking of the prongs in a person's hand, when the animal is handled by its ears. It is seen, therefore, that the final bending action on the prongs 74 is accomplished by the rib 47 which projects upwardly above the outer edges 48 of the concavely curved portions 44.

The closed position of the jaws 23 and 24, shown in Fig. 3, is defined by the engagement of the U-bracket 49 on the jaw 24 with a stop bolt 123 (Figs. 6 and 9) extended through the slot 94 for threadable engagement in the jaw 23, and projected downwardly toward the jaw 24. At this limiting closed position for the jaws 23 and 24, the prongs 74 are in a common plane which is substantially parallel to the plane of the base of the tag 76. Since the grooves 79 on the tag 74 are spaced from the base of the tag a distance substantially greater than the thickness of the ear 120 the prongs 74 and the base of the tag are spaced from either side of the ear 120, as illustrated in Fig. 15, to eliminate any pressing of the free ends of the prongs into the ear.

During the movement of the jaws 23 and 24 toward each other the cam edge 109 on the stripper member 61 is moved into an engaging position with the lateral projection 97 on the slide member 89, and the pivoted member 113 is moved rearwardly with the operating lever 21 so that its forward edge 118 is in abutting engagement with the rear edge of the slide member 89. These relative positions of the projection 97 and the cam edge 109, and of the pivoted member 113 with the slide member 89, are accomplished on completion of the bending of the tag 76 as explained above, and when the tagging device is in its closed position shown in Fig. 3.

As previously mentioned the ends of the coil spring 28 are fixed relative to the lever ends 26 and 27. On release of the spring 28 the spring initially "explodes" or "expands" to an extended position such that its length is greater than its normal released length. In other words the spring 28 first acts to throw itself out and then contract to a normal released length. This action of the coil spring 28 is utilized in the present invention to release the tag 76 from the clip 84, and to provide for the movement of the stripper member 61 away from the tagged ear 120.

Fig. 3 illustrates the relative position of the parts of the tagging device on completion of the tag bending operation and when the coil spring 28 is in what may be termed its "exploded" condition. On contraction of the spring 28 to its normal released length, illustrated in Fig. 4, the lever ends 26 and 27 are moved toward each other by the spring whereby the pivoted actuating member 113 is moved forwardly in response to the movement of the operating lever 21. By virtue of the engagement of the forward edge 118 of the pivoted member 113 with the rear edge of the slide member 89, the member 113 moves the slide member 89 forwardly to release the tag 76 from the hook 93 and in turn from the clip member 84. This release of the tag is facilitated by the upward and forward inclination of the guide members 88 on the front side of the clip member 84.

The forward movement of the slide member 89, by the member 113, provides for a movement of the lateral projection 97 in riding engagement with the cam edge 109, whereby to move the stripper member 61 downwardly and away from the tagged ear 120. As a result the ear 120 is entirely free of the tagging device to eliminate any possibility of the device being jerked out of the operator's hand by a quick movement of the animal being tagged. By virtue of the trigger release of the tagging device and the instantaneous action of the spring 28, a complete tagging operation is accomplished very quickly and in the fractional part of a second so that it is completely over before the animal is aware as to what has taken place.

From the above description of the operation of the invention it is seen that on release of the spring 28, and on movement of the jaws 23 and 24 toward their closing positions, the animal's ear is first engaged by the stripper member 61 and forced over the prongs 74 of the tag 76, as illustrated in Fig. 14. The stripper member then initially bends the prongs 74 at the grooves 79 until the ends of the prongs are within the confines of the reduced box section 66 so as to be in the path of travel of the anvil 42. The anvil 42 moves in a trailing relation with the stripper member 61, by virtue of the slots 71 and pin 53, until after the prongs 74 have been initially bent by the stripper member. At this time the pin 53 engages the cam edges 56 of the member 57 whereby the movement of the stripper member is retarded and the movement of the anvil 42 is continued to bend the prongs 74 to their final position illustrated in Figs. 12, 13 and 15. By virtue of the construction of the anvil 42 with the center rib 47 at a higher level than the outer edges 48 of the arcuately curved surface portions 44, and the limited movement of the jaw 24 as defined by the bolt 123, the prongs are prevented from being pressed into the animal's ear and in their final bent position are spaced from the ear.

From the above description it is seen that the invention provides an improved tagging device which is of a compact and rugged design, capable of being easily handled by one hand of the operator, and completely operable on release of a single finger actuated trigger to efficiently secure a tag in an animal's ear.

By virtue of the top prongs 74 being scored or grooved at 79, the prongs are uniformly bent by the anvil 42 into a substantially common plane spaced from the animal's ear. Further, if any attempt is made to straighten and rebend the prongs after a tagging operation, the prongs will be broken at the grooves 79, whereby to prevent any changing of tags from superior animals to inferior animals for marketing purposes.

Although the invention has been described with respect to a preferred embodiment thereof it is to be understood that it is not to be so limited since changes and modifications can be made therein which are within the full intended scope of this invention as defined by the appended claims.

I claim:

1. An animal ear tagging device comprising a pair of pivoted levers having cooperating jaw members adjacent one of their ends, a releasable tag holding device on one of said jaw members, an anvil on the other of said jaw members, for engaging and bending the tag in a secured position on an animal's ear, a stripper member movably supported on the lever for said other jaw member, lost motion means connecting said stripper member with said anvil for initial movement together towards said tag holding device, means for releasing said tag holding device and for moving said stripper member away from said tag holding device after said jaw members have been moved to a closed position, and spring means acting on said levers to move said jaw members to a closed position.

2. An animal ear tagging device comprising a pair of pivoted operating levers, a pair of cooperating jaw members on said levers, an anvil mounted on one of said jaw members, a pivoted stripper member having a portion adjacent to said anvil adapted to engage an animal's ear, means on the other of said jaw members for holding a tag, and lost motion means connecting said stripper member with said one jaw member to provide for said stripper member portion pressing the animal's ear over the tag prior to the engagement of the tag by said anvil.

3. A tag for an animal ear tagging device comprising a substantially U-shape member having pointed prongs at the free ends of the legs thereof, said legs having a pair of oppositely arranged transverse grooves on their inner sides, and each of said prongs being formed with a long tapered side and a short tapered side, with the long tapered side on one prong being reversely inclined relative to the long tapered side on the other prong to provide for said long tapered sides being positioned adjacent to each other when the prongs are bent inwardly into a common plane substantially parallel with the plane of the leg connecting portion of said U member.

4. An animal ear tagging device comprising a pair of pivoted operating levers, pivot means connecting said levers intermediate their ends, a pair of cooperating jaw members on said levers, an anvil on one of said jaw members, means on the other of said jaw members for holding a tag, a pivoted stripper member pivoted at one end on said pivot means and having its opposite end adjacent to said anvil and adapted to engage an animal's ear, means connecting said stripper member with said one jaw member such that on movement of said jaw members to a closed position, said stripper member engages and presses the animal's ear over the tag prior to the engagement of the tag by said anvil.

5. An animal ear tagging device comprising a pair of cooperating jaw members, means on one of said jaw members for releasably holding a tag, an anvil on the other of said jaw members for engaging and bending the tag in a secured position on an animal's ear, stripper means for pressing an animal's ear over the tag prior to the engagement of the tag by said anvil, and means for releasing the tag from said tag holding means after the tag has been engaged and bent by said anvil.

6. An animal ear tagging device including a pair of cooperating jaw members, means on one of said jaw members for holding a tag, an anvil on the other of said jaw members for engaging and bending the tag in a secured position on an animal's ear, a stripper means movably supported on said other jaw member, and lost motion means connecting said stripper means with said other jaw member for initial movement in a leading relation with said other jaw member and for later movement of said other jaw member relative to said stripper means, so that said stripper means engages and presses an animal's ear over the tag prior to the engagement and bending of the tag by the anvil.

7. An animal tagging device including a pair of cooperating jaw members, means for releasably holding a tag on one of said jaw members including a stationary clip member, a member movably supported on said one jaw member having a portion movable in one direction to engage and releasably hold the tag in said clip member, yieldable means for moving said portion in said one direction, and means for moving said portion in an opposite direction, on completion of a tagging operation to release said tag from said clip member.

8. An animal ear tagging device including a pair of pivoted operating levers having co-acting jaw members adjacent one of their ends, means carried on one of said jaw members for releasably holding a tag, means on the other of said jaw members for engaging and bending said tag in a secured position on an animal's ear, a coil spring for moving said jaw members together fixed between the other ends of said levers, means for releasably holding said spring compressed between said other lever ends, means for releasing said spring to actuate said jaw members, said spring, when released, acting to extend itself beyond a normal length therefor, and then contracting to said normal length, whereby to move said jaw members apart on completion of a tag bending operation, and means responsive in operation to said contracting movement of the spring to release said tag holding means.

9. An animal ear tagging device comprising a pair of cooperating jaw members, means on one of said jaw members for holding a pronged tag, means movably supported on said other jaw member having a first portion for pressing the animal's ear over the tag prongs, and a second portion for engaging and initially bending the tag prongs after the tag prongs are extended through the animal's ear, an anvil on said other jaw member for engaging and finally bending the tag prongs in a secured position on the animal's ear, and lost motion means connecting said other jaw member and said movably supported means to provide for the prior engagement of the tag prongs by said movably supported means.

10. An animal ear tagging device including a pair of pivoted operating levers having co-acting jaw members at one of their ends, means for holding a tag carried on one of said jaw members, an anvil for engaging and bending a tag in a secured position on an animal's ear mounted on the other of said jaw members, a coil spring for moving said jaw members to a closed position connected between the other ends of said pivoted levers, a movable trigger member on one of said levers, and catch means on the other of said levers engageable with said trigger members, when said spring is compressed between said other lever ends, with said spring being released to move said jaw members together on actuation of said trigger member out of engagement with said catch means.

11. An animal ear tagging device including a pair of cooperating jaw members, means on one of said jaw members for releasably holding a tag, means on the other of said jaw members for engaging and bending said tag in a secured position on an animal's ear, means operable in a timed relation with said tag bending means to press the animal's ear over the tag prior to the engagement of the tag by said tag bending means, means for limiting the movement of said jaw members toward each other, and means for releasing said tag holding means on completion of a tag bending operation.

12. An animal ear tagging device comprising a pair of cooperating pivoted jaw members, pivot means for said jaw members, means on one of said jaw members for holding a tag, an anvil on the other of said jaw members, a stripper member pivoted at one end on said pivot means for movement relative to said other jaw member, lost motion means connecting said stripper member with said other jaw, and means for holding said stripper member and other jaw in relative positions such that said stripper member initially leads said other jaw to press an animal's ear over the tag prior to the engagement of the tag by said anvil, and means for moving said stripper member and other jaw away from the tag on completion of a tagging operation.

13. An animal ear tagging device comprising a pair of cooperating jaws, an anvil on one of said jaws for engaging and bending a tag in a secured position on an animal's ear, tag holding means on the other of said jaws, means for inserting a tag through an animal's ear and partially bending the tag over the ear prior to the engagement of the tag by the anvil, and means for moving the anvil and said inserting means away from the tag on completion of a tagging operation.

14. An animal ear tagging device including a pair of cooperating jaw members, means on one of said jaw members for releasably holding a tag, means on the other of said jaw members for engaging and bending said tag in a secured position on an animal's ear, means operable in a timed relation with said tag bending means to provide for the insertion of said tag through an animal's ear and to partially bend the tag over the ear prior to the engagement of the tag by said tag bending means, and means for moving said tag inserting means and said tag bending means away from the tag on completion of a tagging operation.

15. An animal ear tagging device comprising a pair of cooperating jaw members, means on one of said jaw members for holding a tag, means on the other of said jaw members for bending said tag in a secured position on an animal's ear, means for inserting the tag through an animal's ear and partially bending the tag over the ear, and means connecting said other jaw and tag inserting means for relative movement to provide for the prior engagement of the tag by said tag inserting means.

16. An animal ear tagging device including a pair of pivoted operating levers having cooperating jaws adjacent one of their ends, means for releasably holding a tag on one of said jaws, means on the other of said jaws for bending a held tag in a secured position on an animal's ear, means for pressing an animal's ear over the held tag prior to the engagement of the tag by said bending means, and means for moving said ear pressing means and tag bending means away from the tag on completion of a tagging operation.

17. An animal ear tagging device including a pair of cooperating pivoted jaws, means on one of said jaws for holding a tag having prongs, means on the other of said jaws for bending said prongs in a secured position on an animal's ear, means movably supported for pivotal movement relative to said other jaw adapted to insert said prongs through an animal's ear and to partially bend said prongs, lost motion means connecting said prong inserting means and prong bending means such that the prongs are initially engaged by said prong inserting means, and means for moving said prong bending means and said prong inserting means away from said tag on completion of a tagging operation.

J. A. BARGER.

REFERENCES CITED

The following references are of record in the file of this patent:

UNITED STATES PATENTS

| Number | Name | Date |
|---|---|---|
| 849,847 | Medearis | Apr. 9, 1907 |
| 1,188,510 | Timson | June 27, 1916 |